May 31, 1938.   R. H. POLK   2,119,286
SWITCH
Original Filed Aug. 29, 1934   3 Sheets-Sheet 1
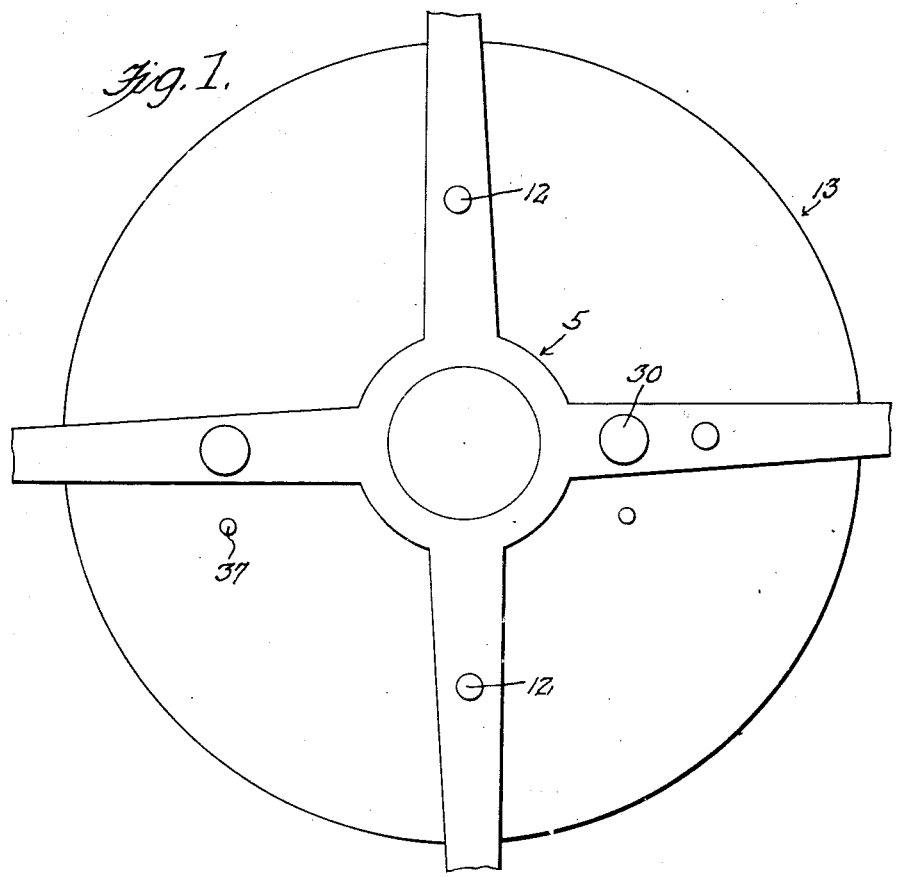
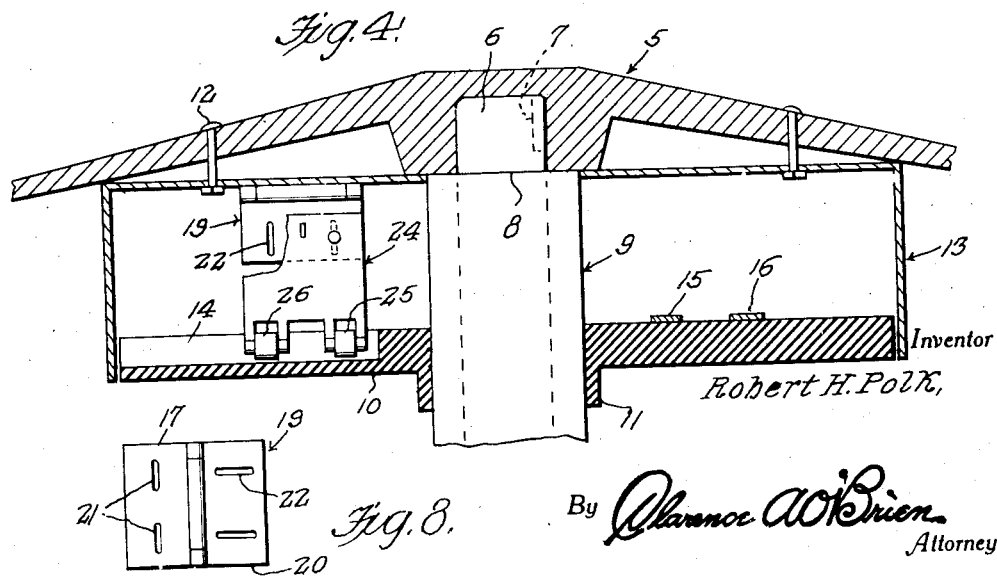
Inventor
Robert H. Polk,
By Clarence A. O'Brien
Attorney

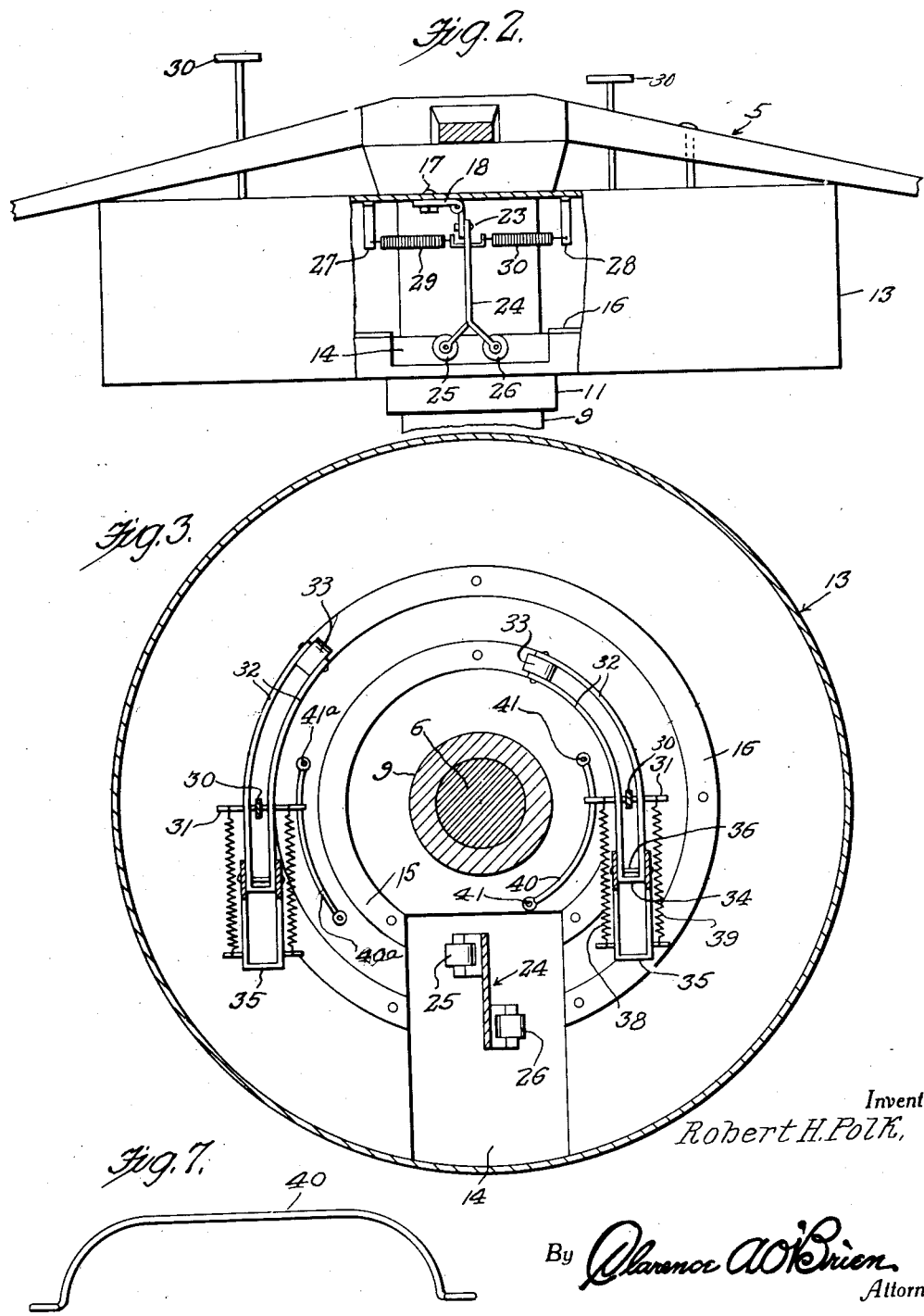

May 31, 1938. R. H. POLK 2,119,286
SWITCH
Original Filed Aug. 29, 1934 3 Sheets-Sheet 3
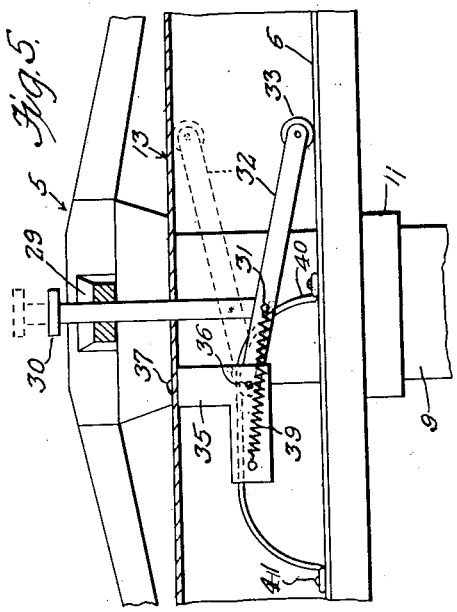
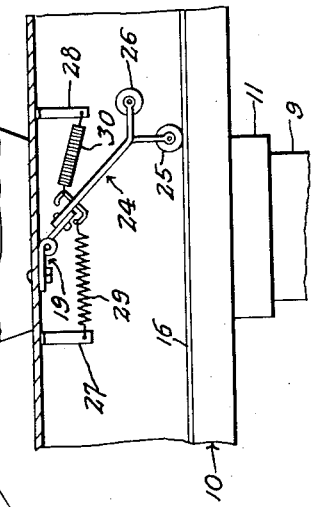
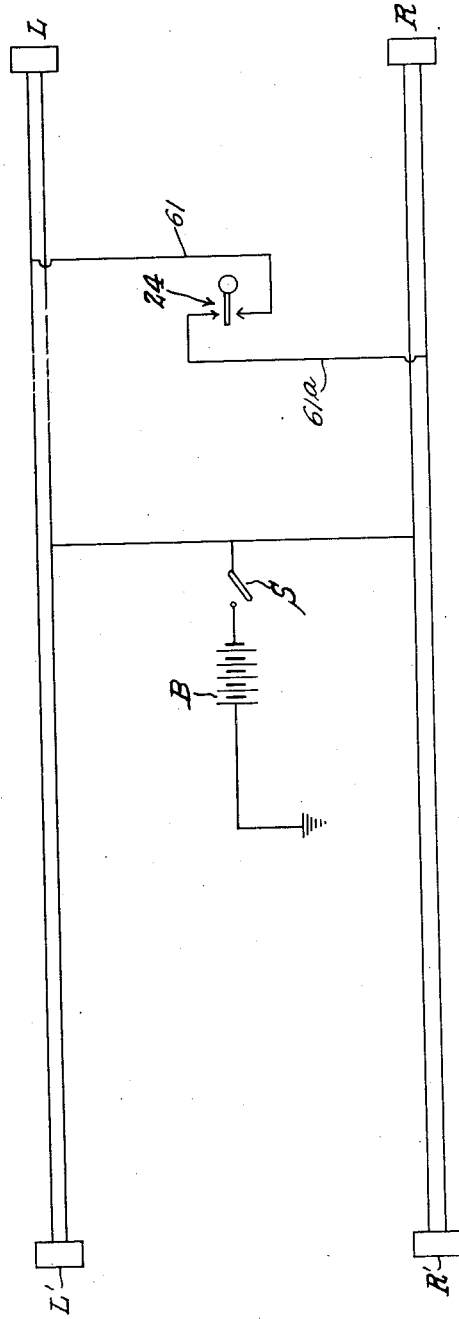
Inventor
Robert H. Polk,
By Clarence A. O'Brien
Attorney Patented May 31, 1938

2,119,286

UNITED STATES PATENT OFFICE 2,119,286

SWITCH

Robert H. Polk, Hapeville, Ga.

Application August 29, 1934, Serial No. 741,970
Renewed November 29, 1937

1 Claim. (Cl. 200—59)

The present invention relates to a switch, and more particularly to a switch which is adapted to be used on the steering wheel of a motor vehicle for actuating and indicating means to indicate when the driver of the vehicle is desirous of making a right or left turn.

It is also an important object of my invention to provide means in a mechanism of this type enabling manually setting the signals anticipatory to the actual making of the turn so as to warn pedestrians and operators of vehicles of the driver's intention to make a turn, the manually set signals being thrown out of operation automatically as the turn is negotiated.

Other objects and advantages of my invention will be apparent from a reading of the following description in connection with the drawings, wherein for purposes of illustration I have shown a preferred embodiment of my invention.

In the drawings:—

Figure 1 is a top plan view of a portion of the spider portion of the steering wheel showing the mechanism casing in top plan.

Figure 2 is a side elevational view of Figure 1 partly in section and showing interior mechanism.

Figure 3 is a horizontal sectional view taken through the mechanism casing showing the mechanism in top plan.

Figure 4 is a transverse vertical sectional view taken through Figure 3 and at right angles to Figure 2.

Figure 5 is a fragmentary transverse vertical sectional view showing one of the manually set circuit closers.

Figure 6 is a transverse vertical sectional view showing the main contact closer in an operative position.

Figure 7 is a side view of one of the re-setting members.

Figure 8 is an elevational view of the hinge of the main circuit closing member showing the slots provided for adjustment.

Figure 9 is a diagrammatic view of the wiring system employed.

Referring in detail to the drawings, the numeral 5 refers generally to the spider portion of an ordinary steering wheel which is keyed on the steering shaft 6 as indicated at 7 so as to have a position above the upper end 8 of the steering column 9 which surrounds the steering shaft 6.

Spaced below the steering wheel is a dielectric disk 10 which has a sleeve portion 11 by which it is keyed to the steering column 9 so as to be stationary with the steering column.

Carried by the web of the steering wheel by means of depending bolts 12 is a cylindrical open bottomed casing 13 which surrounds and covers and protects the dielectric disk 10 as shown in Figure 4, the casing 13 rotating with the steering wheel and relative to the dielectric disk 10.

At one side of the upper surface of the disk 10 is a depression 14, the remainder of the surface of the disk being uniformly level. Concentrically and circumferentially arranged and radially spaced from each other around the steering column 9, the upper surface of the disk 10 carries the flat annular contact bands 15, 16 which terminate at the sides of the depression 14 as shown in Figure 3.

The rearward side of the casing 13 has connected to the underside of its top by means of a bolt 17 one leaf 18 of a hinge construction 19 the other leaf of which is designated 20 and has a normally depending position illustrated in Figure 2. It will be observed that the leaf 18 is provided with radially arranged spaced slots 21 while the leaf 20 is provided with circumferentially arranged radially spaced slots 22 which are vertical in the position of the leaf 20 shown in Figure 2. The bolts 17 in connection with the slots 21 provide for adjusting the leaf 18 radially with respect to the center of the casing, while the vertical slots 22 operate in connection with bolts 23 to vertically adjust a Y-shaped contact arm 24 which carries on its lower end radially spaced contact rollers 25, 26 for engaging and riding upon the contact bands 15, 16, respectively. Depending on either side of the contact arm 24 and secured to the underside of the top of the casing 13 are brackets 27, 28 between which and the contact arm 24 are stretched springs 29, 30 which balance each other in pull so as to give the arm 24 a normally vertical position when it is released from stress, a condition which obtains when the rollers are located in the depression 14, as shown in Figure 2.

As the steering wheel is rotated, carrying the casing 13 with it, it will cause one of the rollers 25, 26 of the contact arm to strike against one side of the recess 14 and then climb the side of the recess and pass onto one of the contact bands 15, 16, and in so engaging either of the bands, ground that end of the circuit through the metal spider of the steering wheel, steering post, and frame of the car, so as to establish a circuit to the corresponding lamp or lamps.

It is obvious, by referring to Figure 6, that when the steering wheel is initially turned slightly to the right the roller 25 mounts the inner track 15 and the roller 26 is held above and out of contact with track 16, and that when the steering wheel is slightly turned to the left, the roller 26 on supporting arm 24 mounts the track 16 and the roller 15 is out of contact with track 15. The track 15 is connected to the outer wire of the signals R and R', and track 16 is connected with the outer wire of signals L and L' as shown in Figure 9. The effect of turning the steering wheel slightly to the right brings the metal roller 25 out of the depression 14 and into contact with track 15, thereby grounding the end of that circuit causing signals R and R' to be energized and remain energized until the steering wheel is rotated back to initial straight ahead position, when arm 24 with rollers 25 and 26 mounted thereon, reaches the depression 14 and assumes a vertical position.

When the steering wheel is turned slightly to the left from the initial position the roller 16 comes into contact with track 26 and lights up signals L and L' which remain showing as long as roller 16 is in contact with track 26. The signals are extinguished when the steering wheel is rotated back to initial position and arm 24 with the associated rollers drops into the depression 14.

Manually settable means for engaging the contact bands while the main contact arm 24 is in the depression 14, for operating the signal lamps anticipatory to actually making a turn, comprise left hand manual contactor generally designated 27 and the right hand contactor generally designated 28. As the contactors 27, 28 are similar in construction, description of one will suffice for description of each of them.

Vertically slidable through one of the spokes 29 of the steering wheel spider 5 as shown in Figure 5 is a hand rod or push button 30 which is slidable in an opening at the top of the casing 13 and is pivotally connected by a pin 31 to and between a pair of curved legs 32 which carry between their outer ends a contact roller 33 for engaging one of the contact bands 15, 16. The opposite or inward ends of the legs 32 are connected by a bight portion 34 which is located between the legs of a U-shaped frame 35 and pivoted thereto by means of a pin 36. The frame 35 is L-shaped in side elevation as shown in Figure 5 and its standard portion is connected by means of a rivet or bolt 37 to the underside of the top of the casing 13. Helical springs 38, 39 are stretched between lugs on the far end of the frame 35 and the opposite ends of the pin 31 so as to snap the legs 32 to one side or the other, that is, below or above dead center alignment so as to yieldably position the contact rollers 33 either in the dotted line elevated position shown in Figure 5 or in the full line depressed position also shown in this figure. It will be obvious that depressing the hand rod 30 will produce the depressed position. Mounted at a suitable point on opposite sides of the center of the disk 10 are inclined re-setting rows 40 and 40a secured by bolts or screws or the like 41 and 41a to the upper surface of the disk 10, and arranged so that the inner end of the pins 31 will ride on the upper surface thereof whenever the steering wheel is returned from a turned position to a straight ahead position with one of the contactors in the engaged or depressed position, the action of the inclined re-setters 40 and 40a on the pins 31 being to elevate the same and to snap the contacted rollers into the elevated position shown in dotted lines in Figure 5, thereby bringing the roller 33 out of contact with its companion one of the contact bands 15, 16 and breaking the manually set circuit and re-setting the contactor.

Reference to Figure 9 will disclose a conventional hook-up wherein the battery B of the automobile or the like furnishes energy for the lamps, one side of the lamps being connected through a hand switch S with one side of the battery, and the remaining sides of the lamps being connected to opposite sides of the contact bands, so that selection of either pair of lamps is made by the rotating of the steering wheel carrying the main contact member 24 into contact with the contact bands as already explained.

Although I have shown and described herein a preferred embodiment of my invention, it is to be definitely understood that I do not desire to limit the invention thereto, and any change or changes may be made in material and structure and arrangement of parts, within the spirit of the invention and the scope of the subjoined claim.

What is claimed is:—

A steering wheel switch for interposition between a source of current and an indicator, said switch comprising a stationary plate, a circular conductor strip on the plate, a pivotal arm, spring means for normally maintaining the pivotal arm off of the said strip, a push button mounted on the steering wheel and connected to the said arm whereby the arm can be moved toward the strip, said arm being in the form of an arcuate shaped yoke, a contact roller mounted between the leg portions of the yoke, said button being provided with a shank disclosed between the leg portions of the yoke shaped arm, a means for pivotally connecting the said shank in this position to the yoke shaped arm, a laterally extending projection on said arm, and an upstanding inverted U-shaped member secured to said plate, said U-shaped member engaging said projection for re-setting said arm.

ROBERT H. POLK.